(12) United States Patent
Tabata

(10) Patent No.: US 6,384,816 B1
(45) Date of Patent: May 7, 2002

(54) IMAGE DISPLAY APPARATUS

(75) Inventor: Seiichiro Tabata, Hino (JP)

(73) Assignee: Olympus Optical, Co. Ltd., Tokyo (JP)

(*) Notice: Subject to any disclaimer, the term of this patent is extended or adjusted under 35 U.S.C. 154(b) by 0 days.

(21) Appl. No.: 09/437,143

(22) Filed: Nov. 10, 1999

(30) Foreign Application Priority Data

Nov. 12, 1998 (JP) .......................................... 10-336482

(51) Int. Cl.$^7$ ................................................ G09G 5/00
(52) U.S. Cl. ...................................... 345/204; 345/696
(58) Field of Search ................................ 345/204, 698, 345/695, 696

(56) References Cited

U.S. PATENT DOCUMENTS

| | | | |
|---|---|---|---|
| 5,537,256 A | 7/1996 | Fergason | 359/495 |
| 5,572,341 A | 11/1996 | Fergason | 359/39 |
| 5,715,029 A | 2/1998 | Fergason | 349/196 |
| 6,195,125 B1 * | 2/2001 | Udagawa et al. | 348/222 |
| 6,219,017 B1 * | 4/2001 | Shimanda et al. | 345/88 |
| 6,243,055 B1 * | 6/2001 | Fergason | 345/32 |

* cited by examiner

Primary Examiner—Kent Chang
Assistant Examiner—Nitin Patel
(74) Attorney, Agent, or Firm—Armstrong, Westerman & Hattori, LLP

(57) ABSTRACT

In an image display apparatus including a delta-array display device and pixel position transition means for repeatedly shifting the respective pixel positions of the display device to each of positions at four points, the pixel shifted positions at the four points are: a first pixel position serving as standard; a second pixel position shifted with respect to the first, standard pixel position horizontally approximately by ½ of horizontal pixel pitch; a third pixel position shifted horizontally approximately by ¾ or ¼ of horizontal pixel pitch and vertically approximately by ½ of vertical pixel pitch; and a fourth pixel position shifted horizontally approximately by ¼ or ¾ of horizontal pixel pitch and vertically approximately by ½ of vertical pixel pitch. The image display apparatus is thereby provided as having an improved, doubled resolution in both vertical and horizontal directions by applying the 4-point pixel shift system to the delta-array display device.

5 Claims, 8 Drawing Sheets

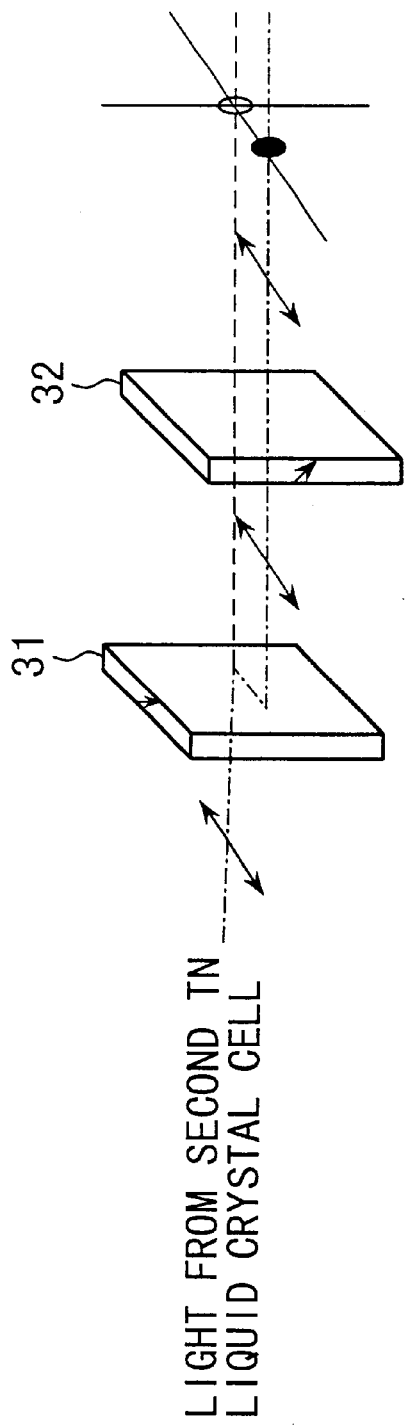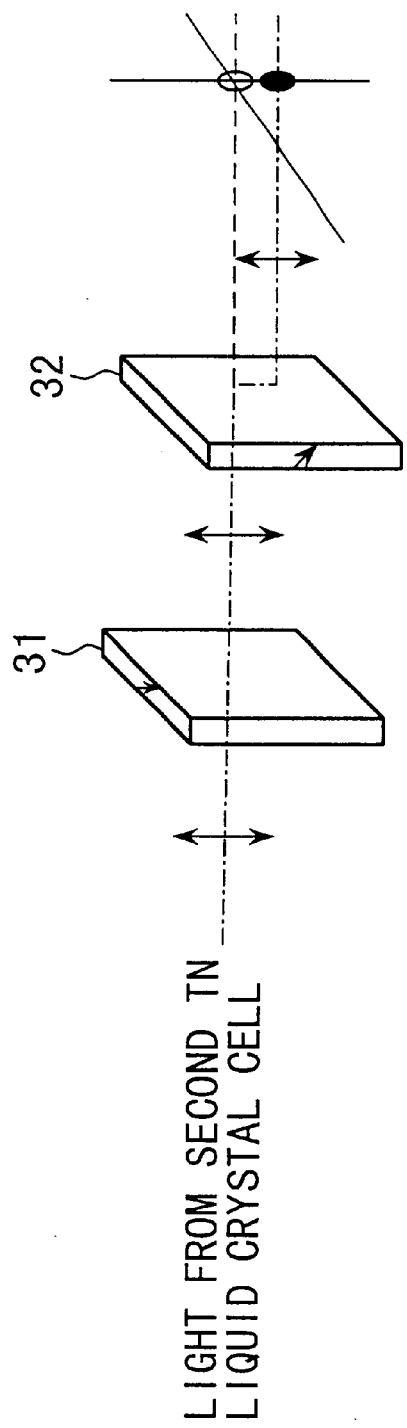

IMAGE DISPLAY APPARATUS

BACKGROUND OF THE INVENTION

The present invention relates to image display apparatus in which high resolution images are displayed by shifting pixels based on an optical wobbling operation.

It is known in image display apparatus using a liquid crystal display device or the like to improve resolution of the liquid crystal display device by performing a pixel shifting operation called "wobbling" where the optical axis of light from the liquid crystal display device is wobbled in predetermined directions.

A technique for improving resolution has been disclosed, for example, in Japanese patent application laid open No. 4-63332, in which two sets each consisting of a liquid crystal panel for controlling the direction of polarization and a quartz plate are used for a displaying liquid crystal panel and at the same time four frame memories are employed therefor. A 4-point pixel shift is effected by causing an image to shift horizontally by ½ pixel pitch through one set of the polarizing direction control liquid crystal panel and quartz plate and causing the image to shift vertically by ½ pixel pitch through the other set of polarizing direction control liquid crystal panel and quartz plate. In other words, one frame is composed of four fields with dividing image signals into four images, and each divided image is stored to a frame memory. These are then synthesized as displayed at respective positions by allowing a straight propagation through the two sets of liquid crystal panels for a first filed, by shifting horizontally by ½ pixel pitch for a second field, by shifting vertically by ½ pixel pitch for a third field, and by shifting ½ pixel pitch both horizontally and vertically for a fourth field. A high-definition image based on the 4-point pixel shift is thereby displayed.

Further, a disclosure has been made in Japanese patent application laid open No. 7-36054 with respect to an optical apparatus achieving high resolution by two-dimensional 4-point pixel shift, provided with two sets of one-dimensional 2-point pixel shifting devices each consisting of a liquid crystal phase modulation device and a birefringence medium. These are combined into a lamination with rotating one of the devices about the optical axis of incidence through 90 degrees with respect to the other to perform four times of pixel shift vertically and horizontally within one frame or one field.

The prior techniques as described above are both related to performance of 4-point pixel shift to attain a quadruple resolution by shifting horizontally, vertically and obliquely by ½ pixel pitch the pixels of a rectangularly arrayed liquid crystal display device having horizontal pixel pitch $P_x$ and vertical pixel pitch $P_y$.

The following problem then occurs if the above described 4-point pixel shift system is simply applied to a liquid crystal display device having pixels disposed in a delta-array of the generally used type as shown in FIG. 1, so as to perform the 4-point pixel shift as shown in FIG. 2. In particular, a frequency band diagram of FIG. 3 results when changes in frequency band are considered in the case of effecting the above described 4-point pixel shift system. Referring to FIG. 3: the transverse axis represents the frequency band in a horizontal direction; the vertical axis represents the frequency band in a vertical direction; the black small circle represents the origin (zero frequency); and white small circles represent the sampling frequencies of the liquid crystal display device. Here, from the sampling theorem where information obtained by sampling is to possess its frequency band only up to ½ of the sampling frequency, the original frequency band of the liquid crystal display device without performing pixel shift, as indicated by the darker dotted region "a", is extended to the frequency band of the lighter dotted region "b" upon performance of 4-point pixel shift as the above. In thus extended frequency band, as can be seen from FIG. 3, while the frequency band is increased in the vertical and oblique directions, the frequency band in the horizontal direction is not increased at all even after the performance of 4-point pixel shift, resulting in a problem that the horizontal resolution is not improved.

SUMMARY OF THE INVENTION

The present invention has been made to eliminate the above problems in the case of applying 4-point pixel shift system of the conventional liquid crystal display device to a liquid crystal display device having delta-array. It is an object of the invention to provide an image display apparatus having 4-point pixel shift system capable of increasing frequency band and improving resolution in both horizontal and vertical directions.

To solve the above problems, there is provided an image display apparatus in accordance with a first aspect of the invention, including: a display device having pixels disposed in a delta-array; pixel position transition means for repeatedly making a transition of pixel positions of the display device respectively to each of positions at four points; and image transition means for making a transition of image signals in synchronization with the pixel position transition means so as to display images corresponding to the pixel positions on the display device. The pixel positions at the four points are: a first pixel position serving as standard; a second pixel position shifted from the standard, first pixel position in a horizontal direction by approximately ½ of horizontal pixel pitch $P_x$; a third pixel position shifted from the standard, first pixel position in the horizontal direction by approximately ¾ or approximately ¼ of horizontal pixel pitch $P_x$ and in a vertical direction by approximately ½ of vertical pixel pitch $P_y$; and a fourth pixel position shifted from the standard, first pixel position in the horizontal direction by approximately ¼ or approximately ¾ of horizontal pixel pitch $P_x$ and in the vertical direction by approximately ½ of vertical pixel pitch $P_y$.

Of the pixel positions changed by the pixel position transition means: the third pixel position ③ is thus determined as shown in FIG. 4 to be shifted from the first, standard pixel position ① horizontally by approximately ¾ of horizontal pixel pitch $P_x$ and vertically by approximately ½ of vertical pixel pitch $P_y$; and the fourth pixel position ④ is determined to be shifted from the first, standard pixel position ① horizontally by approximately ¼ of horizontal pixel pitch $P_x$ and vertically by approximately ½ of vertical pixel pitch $P_y$. As shown in FIG. 6, the original frequency band of the liquid crystal display device without performing pixel shift as indicated by the darker dotted region "A" is thereby extended to the frequency band of region "B" which is lightly dotted. The frequency band is increased in both the vertical and horizontal directions. It is thereby possible to double the resolution not only in the vertical direction but also in the horizontal direction.

Further, resolution in the vertical and horizontal directions can be similarly doubled also by inverting the third pixel position ③ and the fourth pixel position ④ as shown in FIG. 5A, i.e., by determining the third pixel position ③ to be the position shifted from the standard, first pixel position ① by approximately ¼ of horizontal pixel pitch $P_x$ in the horizontal direction and by approximately ½ of vertical pixel pitch $P_y$ in the vertical direction and determining the fourth pixel position ④ to be the position shifted from the standard, first pixel position ① by approximately ¾ of horizontal pixel pitch $P_x$ in the horizontal direction and by approximately ½ of vertical pixel pitch $P_y$ in the vertical direction. Furthermore, as shown in FIG. 5B, a similar advantage can be obtained by inverting the direction of horizontal shift of the third and fourth pixel positions.

It should be noted that "pixel pitch" is defined such that pitch between the adjacent pixels is the pixel pitch in a black-and-white display device and, in the case of a color display device as shown in FIG. 7, pixel pitch of the same color in the same line is the horizontal pixel pitch $P_x$ while pitch between the lines is the vertical pixel pitch $P_y$.

In a second aspect of the invention, the pixel position transition means in the image display apparatus according to the first aspect includes: a first pixel position transition device having a first polarization control means for switching the direction of polarization of incident light and a first optical path control means for switching optical path in accordance with the direction of polarization of emergent light from the first polarization control means; a second pixel position transition device disposed serially to the first pixel position transition device, having a second polarization control means for switching the direction of polarization of incident light and a second optical path control means for switching optical path in accordance with the direction of polarization of emergent light from the second polarization control means; and polarization rotating means disposed between the first pixel position transition device and the second pixel position transition device, for rotating the direction of polarization of incident light through a predetermined angle $\theta=\tan^{-1}\{(2P_y/P_x)\pm n\cdot\pi/2\}$, (n=0, 1, 2, ... ).

In a third aspect of the invention, the pixel position transition means in the image display apparatus according to the first aspect includes: a first pixel position transition device having a first polarization control means for switching the direction of polarization of incident light and a first optical path control means for switching optical path in accordance with the direction of polarization of emergent light from the first polarization control means; a second pixel position transition device disposed serially to the first pixel position transition device, having a second polarization control means for switching the direction of polarization of incident light and a second optical path control means for switching optical path in accordance with the direction of polarization of emergent light from the second polarization control means; and polarization rotating means disposed between the second polarization control means and the second optical path control means of the second pixel position transition device, for rotating the direction of polarization of incident light through a predetermined angle $\theta=\tan^{-1}\{(2P_y/P_x)\pm n\cdot\pi/2\}$, (n=0, 1, 2, ... ).

By using thus constructed polarization rotating means in forming the pixel position transition means, it is possible to readily set a desired oblique shift angle and hence to readily make a transition to the pixel positions at the above described four points.

In a fourth aspect of the invention, the pixel position transition means in the image display apparatus according to the first aspect includes: a first pixel, position transition device having a first polarization control means for switching the direction of polarization of incident light and a first optical path control means for switching optical path in accordance with the direction of polarization of emergent light from the first polarization control means; and a second pixel position transition device disposed serially to the first pixel position transition device, having a second polarization control means for switching the direction of polarization of incident light, a second optical path control means for switching optical path to a horizontal or vertical direction in accordance with the direction of polarization of emergent light from the second polarization control means, and a third optical path control means for switching optical path to a vertical or horizontal direction in accordance with the direction of polarization of emergent light from the second polarization control means.

By thus constructing the pixel position transition means, devices of the same type can be used to form the first polarization control means and the second polarization control means and, since an optical path control means is less expensive than a polarization rotating means, the pixel position transition means can be achieved at a lower cost.

In accordance with a fifth aspect of the invention, there is provided an image display apparatus including: a display device having methodically disposed pixels; pixel position transition means for making a transition of pixel positions of the display device respectively in an oblique direction; and image transition means for making a transition of image signals in synchronization with the pixel position transition means so as to display images corresponding to the pixel positions on the display device.

The pixel position transition means comprises:
polarization control means for switching the direction of polarization of incident light; a first optical path control means for switching optical path to a horizontal direction in accordance with the direction of polarization of incident light; and a second optical path control means for switching optical path to a vertical direction in accordance with the direction of polarization of incident light.

In thus constructed image display apparatus, pixels can be transited in an arbitrary oblique direction by changing a set value (value corresponding to thickness of birefringence plate) of the first optical path control means for horizontally shifting light polarized in horizontal direction and a set value (value corresponding to thickness of birefringence plate) of the second optical path control means for vertically shifting light polarized in vertical direction. It is therefore possible to comply with pitch in the array of any display device.

BRIEF DESCRIPTION OF THE DRAWINGS

FIGS. 13A and 13B show the operation principle of another example of pixel shift optical device in the embodiment shown in FIG. 8.

DESCRIPTION OF THE PREFERRED EMBODIMENTS

Figure 1:
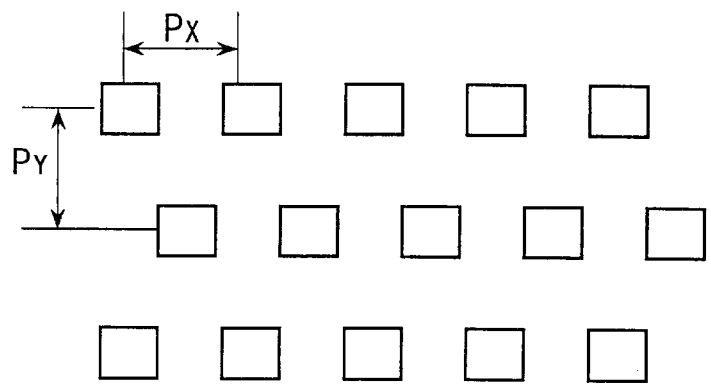
FIG. 1 shows the pixel array of a liquid crystal display device, disposed in the generally used delta-array.
Figure 2:
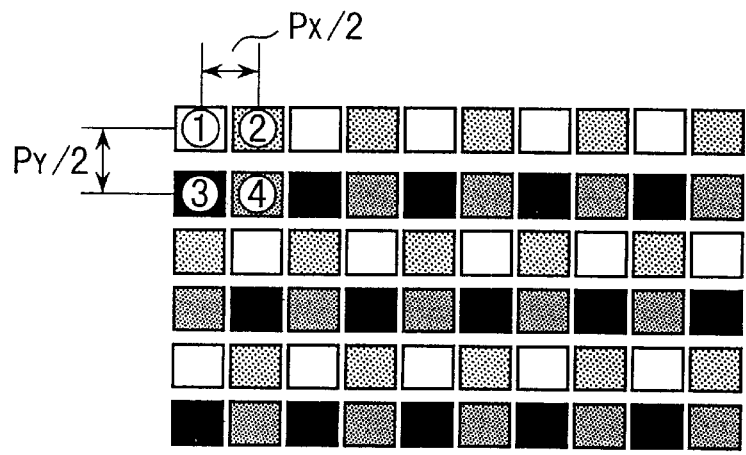
FIG. 2 shows the shifted positions of pixels in the case where the conventional 4-point pixel shift system is applied to a liquid crystal display device having delta-array pixels.
Figure 3:
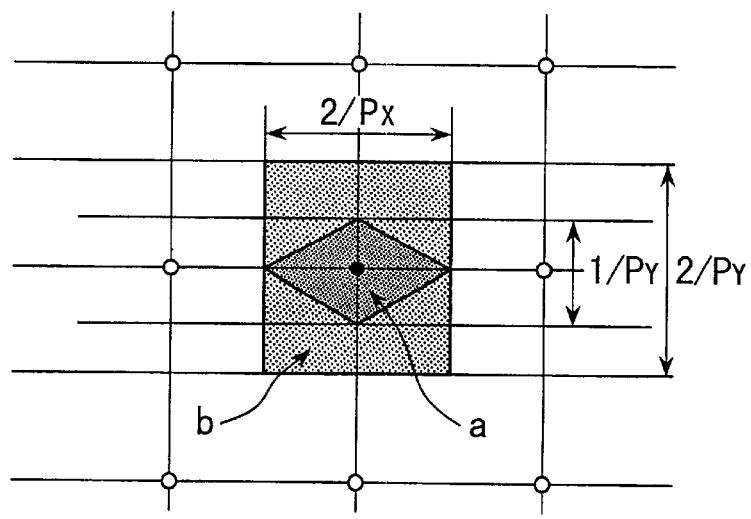
FIG. 3 shows the manner by which frequency band is extended when pixel shift shown in FIG. 2 is performed.
Figure 4:
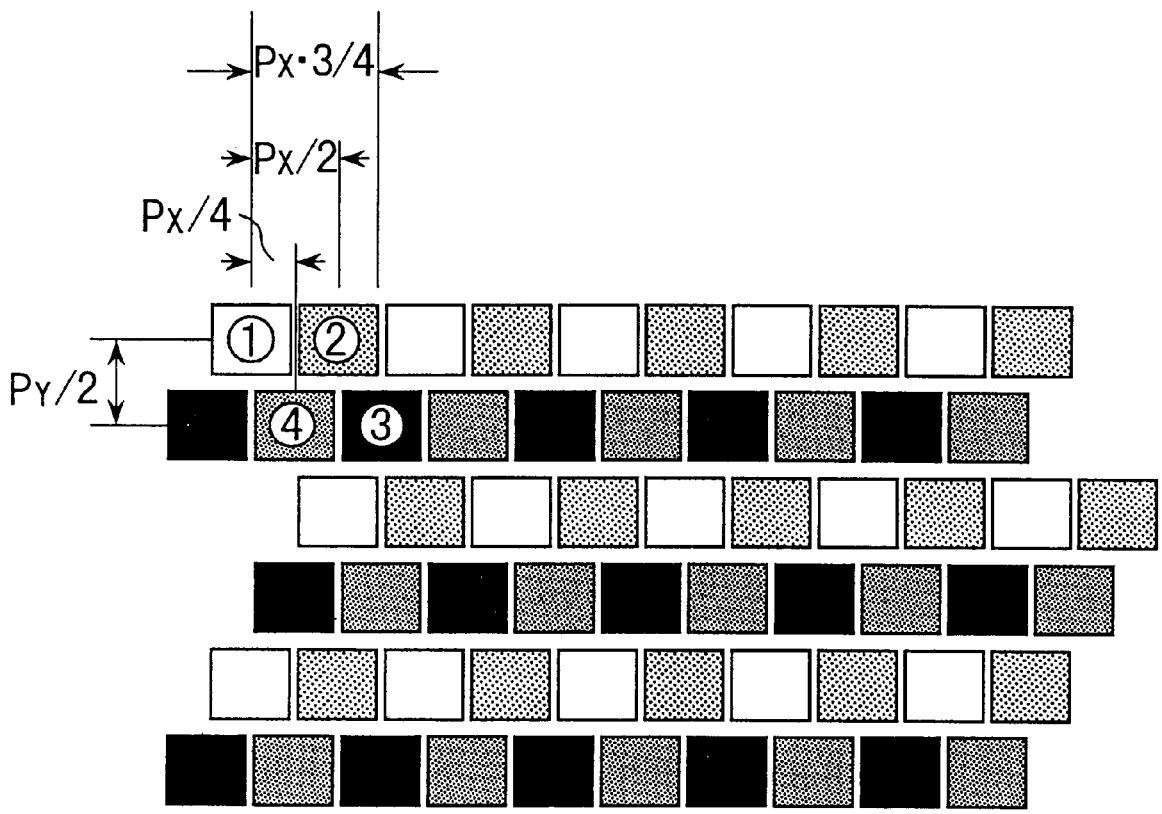
FIG. 4 shows pixel jump positions of the image display apparatus according to the present invention.
Figure 5A:
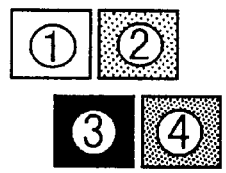
FIGS. 5A and 5B each show a modification of the pixel jump positions shown in FIG. 4.
Figure 5B:
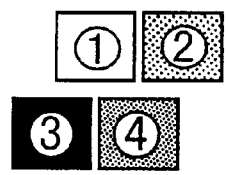
Figure 6:
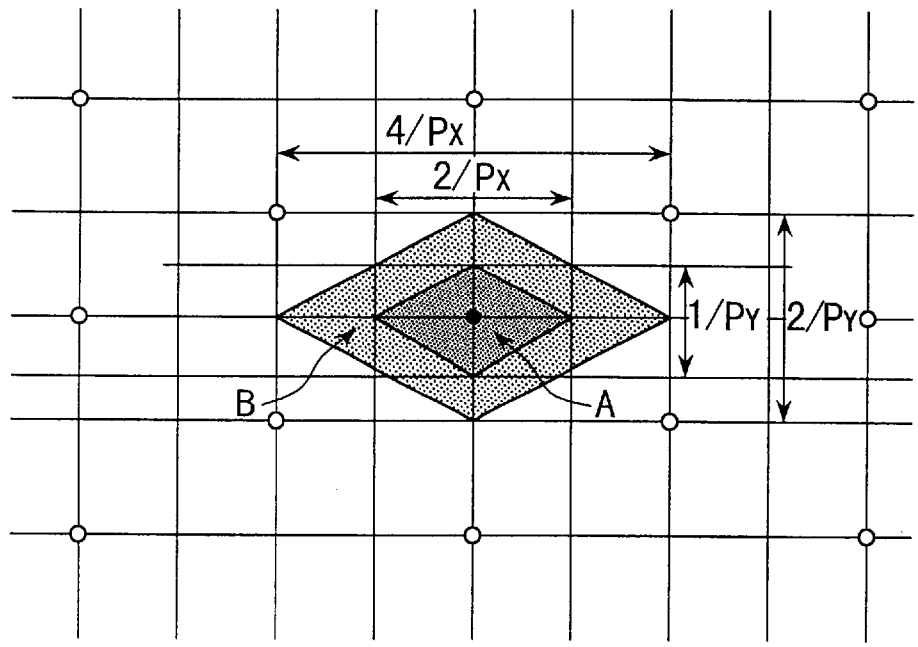
FIG. 6 shows the manner by which frequency band is extended by the pixel shift in the image display apparatus according to the invention.
Figure 7:
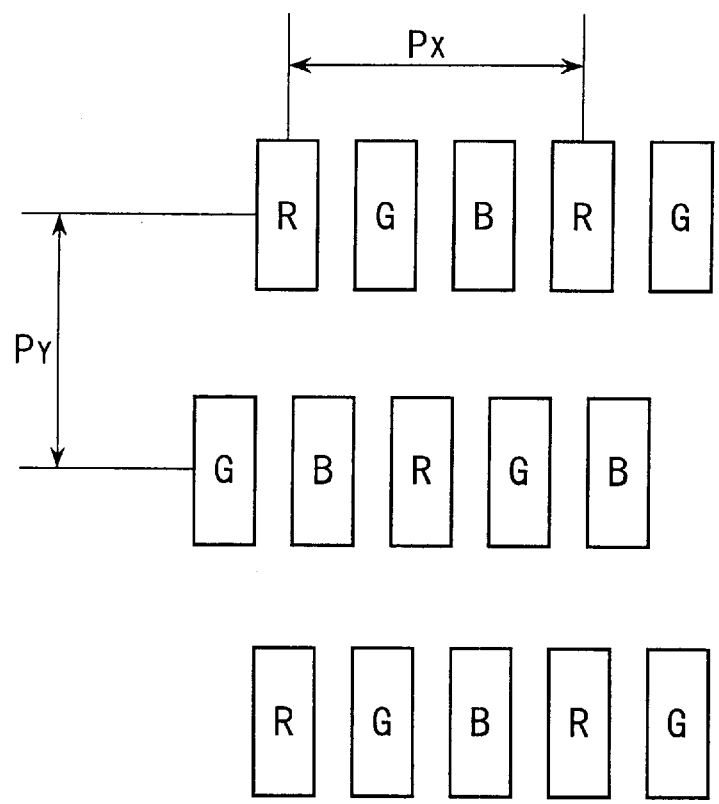
FIG. 7 explains the horizontal pixel pitch and vertical pixel pitch of a color display device.
Figure 8:
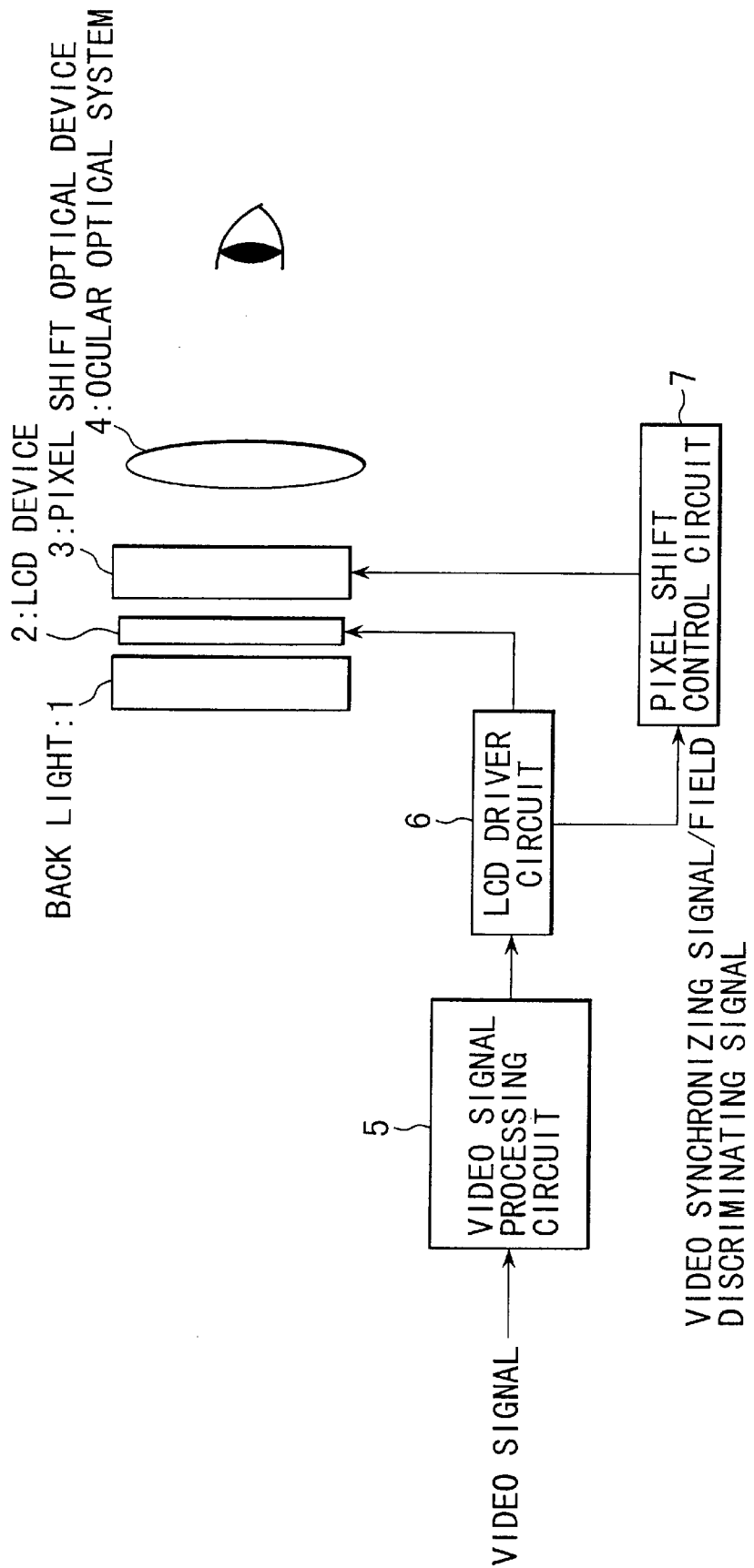
FIG. 8 is a block diagram showing overall construction of an embodiment of image display apparatus according to the invention.

An embodiment of the invention will now be described. FIG. 8 is a block diagram showing an overall construction of image display apparatus according to the invention. The optical system in the image display apparatus of this embodiment includes: a back light 1; a liquid crystal display device 2; a pixel shift optical device (pixel position transition means) 3 for performing pixel shift; and an ocular optical system 4 for observing the pixels after the shift processing in an enlarged form. Further, the construction of the electrical circuit system associated with this optical system includes: a video signal processing circuit 5 for controlling video signals in accordance with pixel shift control; an LCD driver circuit 6 for driving the liquid crystal display device 2; and a pixel shift control circuit 7 for controlling the pixel shift optical device 3 based on video synchronizing signal and field discriminating signal.

Figure 9:
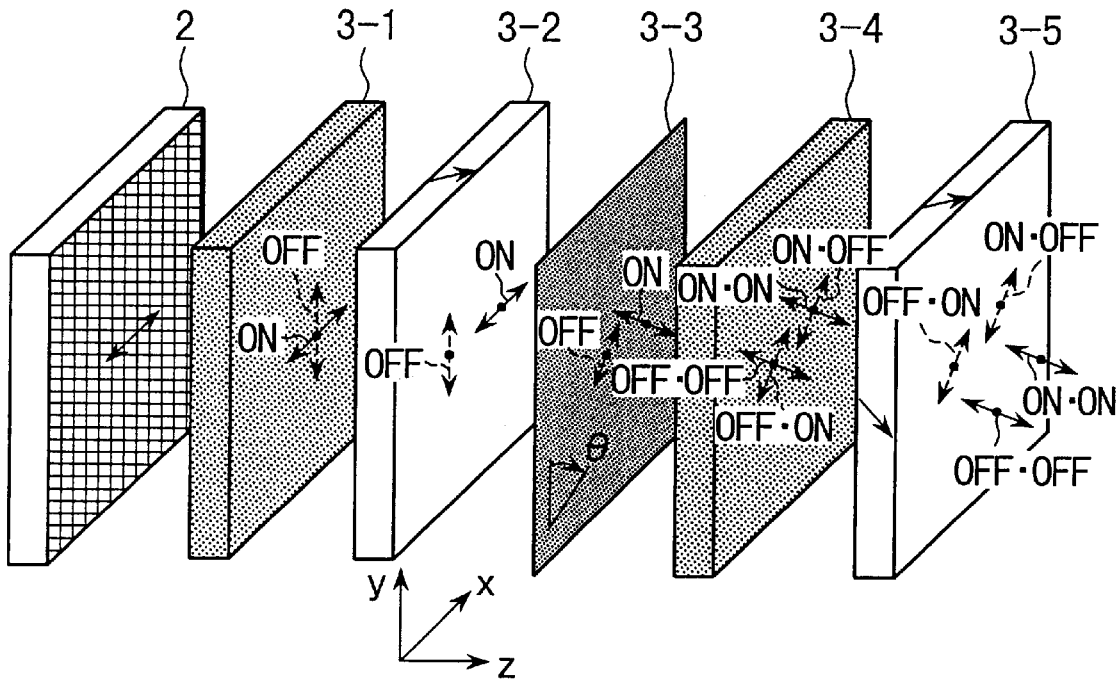
FIG. 9 shows an example of construction of the pixel shift optical device in the embodiment shown in FIG. 8.

A description will now be given, by way of FIG. 9 with respect to a specific example of construction of the pixel shift optical device 3. Referring to FIG. 9, what is denoted by numeral 3-1 is a first TN liquid crystal cell and 3-2 is a first birefringence plate such as of rock crystal or a crystal of lithium niobate (LiNbO$_3$), the first TN liquid crystal cell 3-1 and first birefringence plate 3-2 forming a set to construct a one-dimensional pixel shift device in a horizontal direction. What is denoted by numeral 3-3 is an optical rotary plate having function for rotating the direction of polarization of light corresponding to θ direction, 3-4 is a second TN liquid crystal cell, and 3-5 is a second birefringence plate, the respective materials being the same as the first TN liquid crystal cell 3-1 and first birefringence plate 3-2 but these forming a set to construct a pixel shift device in an oblique, θ-direction.

Operation will now be described of thus constructed pixel shift optical device. As shown in FIG. 9, it is assumed that the liquid crystal display device 2 to be used outputs light of which the direction of polarization is transverse (in a horizontal direction) as indicated by the solid arrow. The first TN liquid crystal cell 3-1 is to change the direction of polarization of emergent light through 90 degrees upon the turning ON/OFF of applied voltage. In particular, when the applied voltage is ON, the direction of polarization is not changed as indicated by the solid arrow and the transversely polarized light is transmitted as it is. When the applied voltage is OFF, the direction of polarization is rotated through 90 degrees, i.e., toward a vertical direction as indicated by the dashed arrow. The crystallographic axis of the first birefringence plate 3-2 is tilted by 45 degrees toward the transverse direction as illustrated so that light with its direction of polarization in the transverse direction, when the applied voltage to the first TN liquid crystal cell 3-1 is ON, is outputted therefrom in a manner shifted transversely as indicated by the solid arrow. On the other hand, when it is OFF, light with its direction of polarization in the vertical direction is transmitted as it is as indicated by the dashed arrow. Accordingly, by turning ON/OFF applied voltage to the pixel shift device consisting of the first TN liquid crystal cell 3-1 and first birefringence plate 3-2, light outputted from the liquid crystal display device 2 is transmitted as it is or outputted in a transversely (horizontally) shifted manner.

Figure 10:
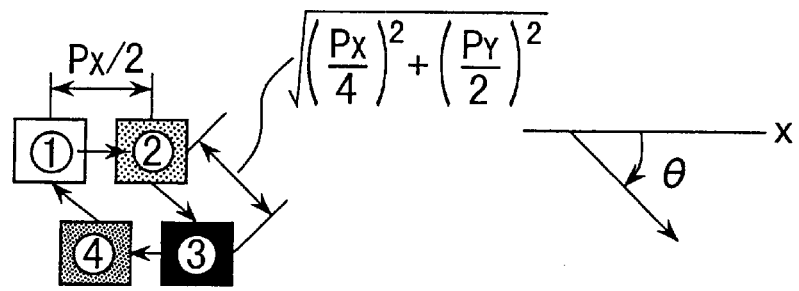
FIG. 10 shows the order of jump of pixel positions by the pixel shift optical device shown in FIG. 9.

It should be noted that amount of such shift is determined by thickness of the first birefringence plate 3-2 and index of birefringence of the birefringence material. Here, the thickness of the first birefringence plate 3-2 is set to a thickness corresponding to the pixel shift amount P$_x$/2 as shown in FIG. 10.

The direction of polarization of light outputted from the first birefringence plate 3-2 is then rotated through q degrees (for example 60 degrees) as indicated by the solid arrow and dashed arrow by the optical rotary plate 3-3. This is to change the direction of polarization through θ degrees in order to shift the emergent position obliquely by θ degrees at the second birefringence plate 3-5 to be described later. It should be noted that, supposing P$_x$ as horizontal pixel pitch and P$_y$ as vertical pixel pitch, an accurate value of θ is expressed by:

$$\theta = \tan^{-1}\{(2P_y/P_x) \pm n \cdot \pi/2\}$$

where n=0, 1, 2, . . .

Light outputted from the rotary polarization plate. 3-3 and entered the second TN liquid crystal cell 3-4 is then changed of its direction of polarization when outputted therefrom, upon the turning ON/OFF of applied voltage in a similar manner as in the first TN liquid crystal cell 3-1. In particular, when the applied voltage is ON, the direction of polarization is not changed and light having been subjected to optical rotary at the optical rotary plate 3-3 is transmitted as it is without change in the direction of polarization as indicated by the solid arrow of ON-ON and dashed arrow of OFF-ON. When the applied voltage is OFF, the direction of polarization is rotated through 90 degrees and light is outputted therefrom with its direction of polarization rotated through 90 degrees as indicated by the dashed arrow of ON-OFF and solid arrow of OFF-OFF.

Next, light outputted from the second TN liquid crystal cell 3-4 enters the second birefringence plate 3-5. The second birefringence plate 3-5 has its crystallographic axis leaned both horizontally and vertically by θ degrees, i.e., the crystallographic axis is obliquely tilted. Accordingly, from the second birefringence plate 3-5 having such a tilted crystallographic axis, light indicated by the OFF-ON dashed arrow and light indicated by the ON-OFF dashed arrow are outputted as they are and light indicated by the ON-ON solid arrow and light indicated by the OFF-OFF solid arrow are outputted from positions respectively shifted in oblique direction by θ degrees. It should be noted that thickness of the second birefringence plate 3-5 corresponds to the pixel shift amount $\{(P_x/4)^2+(P_y/2)^2\}^{1/2}$ as shown in FIG. 10.

As the above, light outputted from the liquid crystal display device 2 can be controlled so that it be transmitted to the pixel positions ① to ④ as shown in FIG. 10 by combining ON/OFF of applied voltages to the first and second TN liquid crystal cells 3-1 and 3-4 as shown in Table 1. It should be noted that, by controlling ON/OFF of the applied voltages according to the order shown in Table 1, the pixel positions are cycled in the order indicated by the arrows in FIG. 10.

TABLE 1

| First TN LC cell | Second TN LC cell | Pixel position |
|---|---|---|
| OFF | ON | ① |
| ON | OFF | ② |
| ON | ON | ③ |
| OFF | OFF | ④ |

Figure 11:
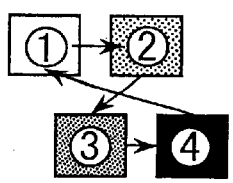
FIG. 11 shows another order of shift of pixel positions by the pixel shift optical device shown in FIG. 9.

Further, by using the order of applied voltage combination as shown in Table 2, the pixel positions are controlled to achieve the order as indicated by the arrows of FIG. 11, i.e., a crossing order.

TABLE 2

| First TN LC cell | Second TN LC cell | Pixel position |
|---|---|---|
| OFF | ON | ① |
| ON | OFF | ② |
| OFF | OFF | ③ |
| ON | ON | ④ |

If image is to be corrected at a later stage in the electric circuitry, the crossing order used as the order of pixel shift results in the adjacent pixels far apart from each other in some part (from pixel position ④ to pixel Position ①) and in some cases is unfavorable as compared to the cycled type. In terms of electric circuit, however, the crossing order system without backward scanning is more favorable, since it is not necessary to switch data to be displayed in displaying the pixel positions of ③ and ④.

Note that start position can be any of the positions in the pixel shift system of both the cycled type and the crossing order. Further, it is naturally possible to reverse the or der of cycle shown in Table 1 or Table 2.

Figure 12:
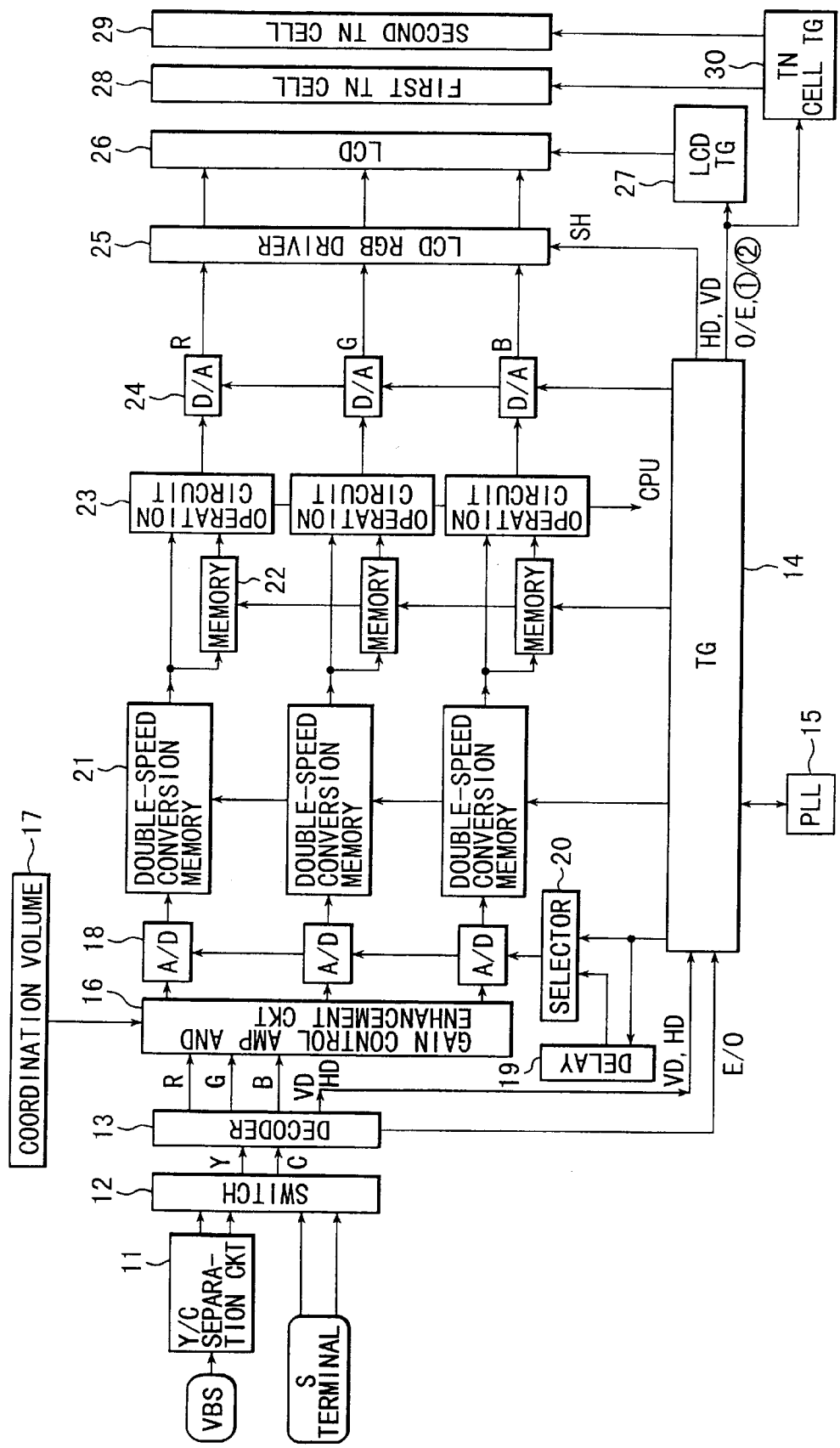
FIG. 12 is a block diagram showing an example of construction of the electric circuitry in the embodiment shown in FIG. 8.

An example of construction of electric circuit system such as the video signal processing circuit will now be described by way of the block diagram in FIG. 12. The input signal may be a composite video signal VBS or Y, C signals to be inputted through S terminal. In the case of composite video signal VBS, Y signal and C signal are first separated from each other at a Y/C separation circuit 11. At a switch circuit 12, then, one of the composite video signal VBS or an input signal from S terminal is selected to output Y signal and C signal. The Y signal and C signal from the switch circuit 12 are inputted to a decoder 13 so as to be converted into R, G, B signals. At the same time, vertical synchronizing signal VD and horizontal synchronizing signal HD and furthermore field signal E/O are extracted therefrom and are inputted to a timing generation circuit 14. What is denoted by numeral 15 is a PLL circuit.

The R, G, B signals from the decoder 13 are inputted to a gain control amplification and enhancement circuit 16 where contrast control of picture, the contrast control of a certain frequency in the horizontal direction, etc., are performed. Here, the user can adjust the contrast, enhancement, etc., by means of a coordination volume 17. An output signal from the gain control amplification and enhancement circuit 16 is subjected to analog-to-digital conversion at an analog-to-digital converter 18 where sampling for the A/D conversion is performed at a frequency twice the sampling frequency of an ordinary liquid crystal display device in order to cause the shift of pixel position to a mid position in the pixel pitch of the liquid crystal display device.

If pixel transition is to be caused by shifting pixel positions as shown in FIG. 10 or 11, supposing that the pixel positions ①, ② are of even (E) fields and that the pixel positions ③, ④ are of odd (O) fields, the sampling timing at analog-to-digital converter for odd fields is delayed through a delay circuit 19 for a time period corresponding to $P_x/4$. Note that a selector 20 is to selectively switch between the sampling timing for even field and the sampling timing for odd filed which has been delayed through the delay circuit 19.

What is denoted by numeral 21 is a double-speed conversion memory provided for each of R, G, B signals, having memory corresponding to the number of field pixels. At the time of readout, for example in the case of an even field, the video signals corresponding to the pixel positions of ① are read out at a speed twice an ordinary speed and, after completion of such readout, the video signals corresponding to the pixel positions of ② are read out also at a speed twice the ordinary speed. In the case of an odd field, the video signals corresponding to the pixel positions of ③ are read out and then the video signals corresponding to the pixel positions of ④ are read out.

FIFO memory 22 is the memory for storing video signals of previous field. The video signals of previous field stored at the FIFO memory 22 and the video signals of current field are used to correct image by operation processing at an operation circuit 23. Since the response speed of a liquid crystal display device is relatively slow, signals tend to leak into adjacent pixels. It is thus necessary to emphasize contrast. For this reason, in the image correction performed at the operation circuit 23, the video signals of previous field and the video signals of current field are compared and operation processing is performed in such a manner as to achieve a greater difference thereof so that new video signals are outputted with emphasizing contrast.

The video signals after the operation processing of picture correction by the operation circuit 23 are converted into analog signals at a digital-to-analog converter 24 and are inputted to an LCD RGB driver 25 at the same time of sample hold signal SH supplied from the timing generator 14.

At the LCD RGB driver 25, then, LCD drive signals are generated and are applied to a liquid crystal display device (LCD) 26 to drive the liquid crystal display device 26. Note that those inputted to a timing generator 27 for LCD from the timing generator 14 so as to generate and output timing signals for liquid crystal display device 26 are: vertical synchronizing signal VD; horizontal synchronizing signal HD; O/E signal for representing an odd field or even field; and ①/② signal for representing whether it is the first field or the second field in an odd or even field. Denoted by numerals 28, 29 are first and second TN liquid crystal cells, respectively. The first and second TN liquid crystal cells 28, 29 are driven as timing signals are respectively transmitted thereto from a timing generator 30 for TN liquid crystal cells, which receives similar signals as those received by the above described LCD timing generator 27 to generate the timing signals for TN liquid crystal cells.

It should be noted that the operation circuit 23 is shown such that it exchanges signals with CPU (not shown). This represents the fact that, since the response speed of a liquid crystal display device varies by temperatures, control is effected by CPU so as to change operation factors at the operation circuit 23 according to the temperature.

Further, the pixel shift optical device of this example is shown as that in which the direction of polarization of light outputted from a transverse pixel shift device is rotated through θ degrees by the optical rotary plate 3-3 and it is then caused to enter an oblique pixel shift device. A similar advantage however can be obtained by disposing the oblique pixel shift device at an earlier stage and the direction of polarization is backed to the horizontal direction by an optical rotary plate, then causing it to enter a transverse pixel shift device disposed at a subsequent stage.

A description will now be given with respect to another example of construction of pixel shift optical device (pixel position transition means) for shifting pixel position to four positions. While the pixel shift optical device in FIG. 9 has been shown as that using an optical rotary plate, this example is adapted to achieve similar function as in the case of using the optical rotary plate by, instead of an optical rotary plate, disposing two pieces of birefringence plates for the TN liquid crystal cell at the latter stage.

This will be described below by way of an illustration for explaining its principle shown in FIGS. 13A and 13B. Referring to FIGS. 13A and 13B, a first-stage birefringence plate 31 shifts an emergent position horizontally, i.e., causes it to jump in a horizontal direction and a second stage birefringence plate 32 shifts an emergent position vertically, i.e., causes it to jump in a vertical direction. By combining the two birefringence plates 31 and 32 one upon the other, it becomes possible to shift the emitting position obliquely, i.e., to cause it to jump in an oblique direction. In particular, supposing as shown in FIG. 13A that light with its direction of polarization in the horizontal direction has entered the first-stage birefringence plate 31 from the second TN liquid crystal cell at the latter stage of the pixel shift optical device, the emergent pixel position is caused to shift in the horizontal direction. Since the birefringence plate 32 at the next stage does not act at all on the light with its direction of polarization in a transverse direction, it is transmitted as it is and the pixel position is outputted in its state of transverse shift (as indicated by the black circle).

Next, supposing as shown in FIG. 13B that light with its direction of polarization in the vertical direction has entered the first-stage birefringence plate 31 from the second TN liquid crystal cell, since the vertical light is not acted upon at all, it is transmitted as it is and enters the second-stage birefringence plate 32. From the second-stage birefringence plate 32, it is outputted with pixel position shifted vertically (as indicated by the black circle).

Accordingly, when the state of output from the second-stage birefringence plate 32 in FIG. 13B is seen from the state of output from the second-stage birefringence plate 32 in FIG. 13A, the pixel position indicated by black circle is moved from a transversely shifted position to a vertically shifted position. This is, in the result, an obliquely shifted state. It is thus possible to cause an oblique shift of the light outputting position, i.e., pixel position, by placing a combined pair of birefringence plates in the cource of light coming from the latter-stage, second TN liquid crystal cell with its direction of polarization in the horizontal and vertical planes.

Figure 14:
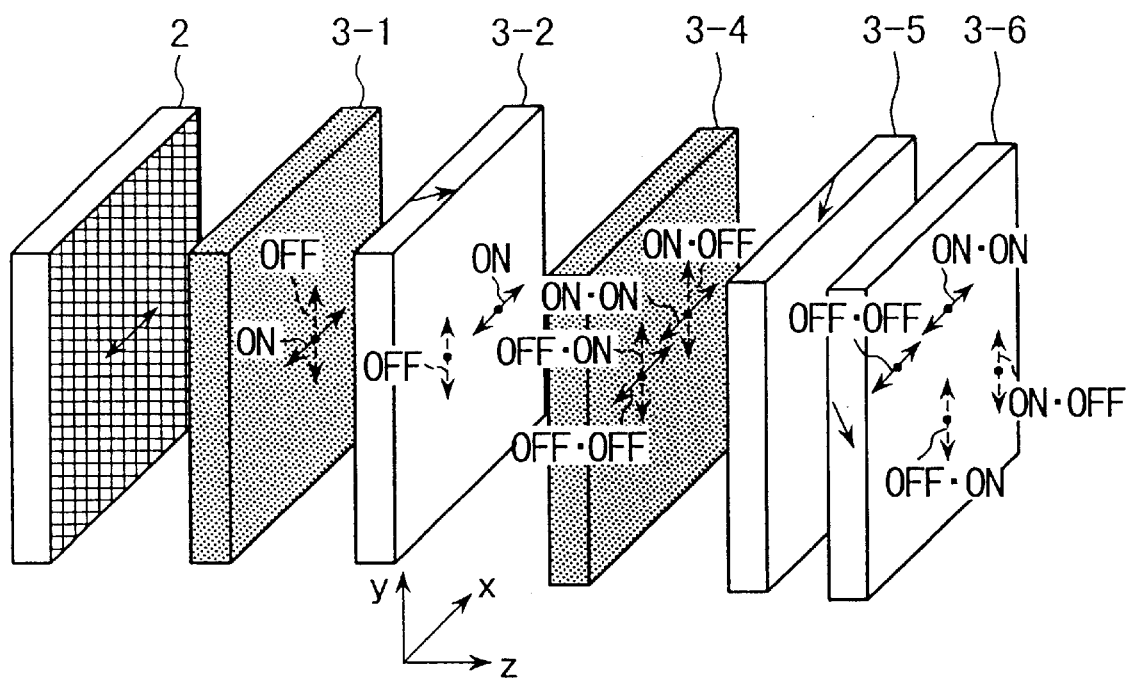
FIG. 14 shows another example of construction of pixel shift optical device based on the illustration shown in FIGS. 13A and 13B.

FIG. 14 shows the construction of a pixel shift optical device constructed by using this principle. In the pixel shift optical device shown in FIG. 14, identical or corresponding components as in the pixel shift optical device shown in FIG. 9 are denoted by identical symbols. This pixel shift optical device includes: a transverse pixel shift device consisting of a first TN liquid crystal cell 3-1 and a first birefringence plate 3-2; and an oblique pixel shift device consisting of a second TN liquid crystal cell 3-4, a second birefringence plate 3-5, and a third birefringence plate 3-6.

Note that the second birefringence plate 3-5 and third birefringence plate 3-6 correspond to the first-stage birefringence plate and second-stage birefringence plate shown in the illustration for explaining principle in FIGS. 13A and 13B. Here the second birefringence plate 3-5 has a thickness corresponding to $P_x/4$ in pixel shift positions in FIG. 15, and the third birefringence plate 3-6 has a thickness corresponding to $P_y/2$ in FIG. 15. Further, the thickness of the first birefringence plate 3-2 corresponds to $P_x/2$ in a similar manner as in the case of the pixel shift optical device shown in FIG. 9.

Operation will now be described of thus constructed pixel shift optical device. In this pixel shift optical device, too, it is assumed that the liquid crystal display device 2 to be used emits light with its direction of polarization in a transverse direction (horizontal direction) as indicated by the solid arrow. The first TN liquid crystal cell 3-1 is to change the direction of polarization of outputted light through 90 degrees upon turning ON/OFF of applied voltage. The crystallographic axis of the first birefringence plate 3-2 is tilted by 45 degrees toward the transverse direction as illustrated so that light with its direction of polarization in the transverse direction, when the applied voltage to the first TN liquid crystal cell 3-1 is ON, is outputted therefrom in a manner shifted transversely as indicated by the solid arrow. On the other hand, when it is OFF, light with its direction of polarization in the vertical direction is not acted upon and is transmitted as it is as indicated by the dashed arrow. Accordingly, by turning ON/OFF applied voltage to the pixel shift device consisting of the first TN liquid crystal cell 3-1 and first birefringence plate 3-2, tight emitted from the liquid crystal display device 2 is transmitted as it is or outputted in a transversely (horizontally) shifted manner.

The light incident upon the second TN liquid crystal cell 3-4 is then changed in the direction of polarization when exiting therefrom through 90 degrees upon turning ON/OFF of applied voltage in a similar manner as in the first TN liquid crystal cell 3-1. In particular, when the applied voltage is ON, the direction of polarization is not changed and it is transmitted as it is without change in the direction of polarization as indicated by the solid arrow of ON-ON and dashed arrow of OFF-ON. When the applied voltage is OFF, the direction of polarization is rotated through 90 degrees and it is outputted with its direction of polarization rotated through 90 degrees as indicated by the dashed arrow of ON-OFF and solid arrow of OFF-OFF.

The light outputted from the second TN liquid crystal cell 3-4 is then passed through two pieces of birefringence plates, i.e., the second birefringence plate 3-5 with its crystallographic axis tilted transversely and the third birefringence plate 3-6 with its crystallographic axis tilted vertically so that, as shown in the illustration for explaining principle of FIGS. 13A and 13B, light with its direction of polarization in the transverse direction is outputted from the third birefringence plate 3-6 as somewhat shifted transversely as indicated by the solid arrow of ON-ON and solid arrow of OFF-OFF. On the other hand, light with its direction of polarization in the vertical direction is outputted as somewhat shifted vertically as indicated by the dashed arrow of. ON-OFF and dashed arrow of OFF-ON. In other words, the vertically polarized lights are outputted from positions obliquely shifted with respect te the transversely polarized lights.

Figure 15:
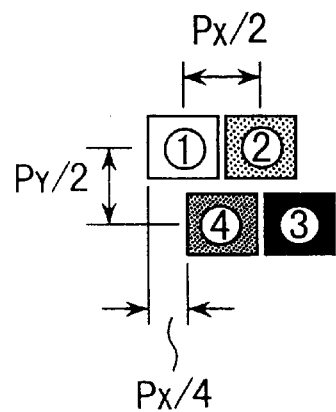
FIG. 15 shows pixel shift positions by the pixel shift optical device shown in FIG. 14.

As the above, by setting an order of combination of ON/OFF of applied voltage to the first and second TN liquid crystal cells 3-1 and 3-4 as shown in Table 3, the emitting positions (pixel positions) from the liquid crystal display device 2 can be controlled to the pixel positions of ① to ④ as shown in FIG. 15.

TABLE 3

| First TN LC cell | Second TN LC cell | Pixel position |
|---|---|---|
| OFF | OFF | ① |
| ON | ON | ② |
| ON | OFF | ③ |
| OFF | ON | ④ |

Now, the second TN liquid crystal cell to be used in the above described pixel shift optical device as shown in FIG. 9 cannot be of the same type as the first TN liquid crystal cell, since what is incident thereupon is a, polarized light of which the direction of polarization is rotated and caused to incline by an optical rotary plate. In the pixel shift optical device of this example shown in FIG. 14, however, since polarized light having the same, direction of polarization is caused to be incident upon the first TN liquid crystal cell and second TN liquid crystal cell, it is possible to use TN liquid crystal cells of the same type therefor and hence an advantage in cost is achieved. Further, this pixel shift optical device uses a combination of two pieces of birefringence plate instead of an optical rotary plate. In this regard, too, there is an advantage in cost, since optical rotary plates are more expensive than birefringence plates. Note that, of the pixel shift optical device shown in FIG. 9, it is possible to dispose the optical rotary plate 3-3 between the second TN liquid crystal cell 3-4 and the second birefringence plate 3-5. In such a case, the first TN liquid crystal cell and the second liquid crystal cell to be used can be of the same type.

Further, in the pixel shift optical device shown in FIG. 14, the thickness of the first birefringence plate is twice the thickness of the second birefringence plate. Accordingly, it is also possible to construct the first birefringence plate by placing two pieces of second birefringence plates one upon the other and by adjusting the direction of their crystallographic axes. By using such construction, it is possible to construct the device as a whole by two types of birefringence plates, achieving a cost-effective merit.

Furthermore, in this exemplary construction, too, a similar advantage can be obtained by constructing the pixel shift optical device such that a pixel shift device for oblique direction consisting of the second TN liquid crystal cell 3-4, the second birefringence plate 3-5, and the third birefringence plate 3-6 is disposed at an earlier stage and a pixel shift device for transverse direction consisting of the first TN liquid crystal cell 3-1 and the first birefringence plate 3-2 is disposed at a subsequent stage.

As has been described by way of the above embodiments, since, in accordance with the first aspect of the invention, the third and fourth pixel positions are shifted obliquely with respect to the standard pixel position in the 4-point pixel shift of delta-arrayed display device, the resolution can be doubled not only in a vertical direction but also in a horizontal direction. In accordance with the second or third aspect of the invention, it is possible to readily set a desired shift angle in oblique direction so that transition to pixel positions at four points can be readily effected. In accordance with the fourth aspect of the invention, it is possible to construct the pixel position transition means at a relatively low cost. In accordance with the fifth aspect of the invention, an oblique transition of pixel can be effected in an arbitrary direction by changing set values at the first optical path control means for causing a shift in horizontal direction and at the second optical path control means for causing a shift in vertical direction, and hence it is possible to comply with arrayed pitch in any, display device.

What is claimed is:

1. An image display apparatus comprising:
   a display device having pixels disposed in a delta-array;
   pixel position transition means for repeatedly making a transition of pixel positions of the display device respectively to each of positions at four points; and
   image transition means for making a transition of image signals in synchronization with the pixel position transition means so as to display images corresponding to said pixel positions on said display device, pixel positions at said four points comprising:
   a first pixel position serving as standard;
   a second pixel position shifted from the standard, first pixel position in a horizontal direction by approximately ½ of horizontal pixel pitch $P_x$;
   a third pixel position shifted from said standard, first pixel position in the horizontal direction by approximately ¾ or approximately ¼ of horizontal pixel pitch $P_x$ and in a vertical direction by approximately ½ of vertical pixel pitch $P_y$; and
   a fourth pixel position shifted from said standard, first pixel position in the horizontal direction by approximately ¼ or approximately ¾ of horizontal pixel pitch $P_x$ and in the vertical direction by approximately ½. of vertical pixel pitch $P_y$.

2. The image display apparatus according to claim 1, wherein said pixel position transition means comprises:
   a first pixel position transition device having a first polarization control means for switching the direction of polarization of incident light and a first optical path control means for switching optical path in accordance with the direction of polarization of emergent light from the first polarization control means;
   a second pixel position transition device disposed serially to said first pixel position transition device, having a second polarization control means for switching the direction of polarization of incident light and a second optical path control means for switching optical path in accordance with the direction of polarization of emergent light from the second polarization control means; and
   polarization rotating means disposed between said first pixel position transition device and the second pixel position transition device, for rotating the direction of polarization of incident light through a predetermined angle $\theta = \tan^{-1}\{(2P_y/P_x) \pm n \cdot \pi/2\}$, (n=0, 1, 2, . . . ).

3. The image display apparatus according to claim 1, wherein said pixel position transition means comprises:
   a first pixel position transition device having a first polarization control means for switching the direction of polarization of incident light and a first optical path control means for switching optical path in accordance with the direction of polarization of emergent light from the first polarization control means;
   a second pixel position transition device disposed serially to said first pixel position transition device, having a second polarization control means for switching the direction of polarization of incident light and a second optical path control means for switching optical path in accordance with the direction of polarization of emergent light from the second polarization control means; and
   polarization rotating means disposed between the second polarization control means and the second optical path control means of the second pixel position transition device, for rotating the direction of polarization of incident light through a predetermined angle $\theta=\tan^{-1}\{(2P_y/P_x)\pm n\cdot\pi/2\}$, (n=0, 1, 2, . . . ).

4. The image display apparatus according to claim 1, wherein said pixel position transition means comprises:

a first pixel position transition device having a first polarization control means for switching the direction of polarization of incident light and a first optical path control means for switching optical path in accordance with the direction of polarization of emergent light from the first polarization control means; and a second pixel position transition device disposed serially to said first pixel position transition device, having a second polarization control means for switching the direction of polarization of incident light, a second optical path control means for switching optical path to a horizontal or vertical direction in accordance with the direction of polarization of emergent light from the second polarization control means, and a third optical path control means for switching optical path to a vertical or horizontal direction in accordance with the direction of polarization of emergent light from said second polarization control means.

5. An image display apparatus comprising:

a display device having methodically disposed pixels;

pixel position transition means for making a transition of pixel positions of the display device respectively in an oblique direction; and image transition means for making a transition of image signals in synchronization with the pixel position transition means so as to display images corresponding to said pixel positions on said display device, said pixel position transition means comprising:

polarization control means for switching the direction of polarization of incident light;

a first optical path control means for switching optical path to a horizontal direction in accordance with the direction of polarization if incident light; and a second optical path control means for switching optical path to a vertical direction in accordance with the direction of polarization of incident light, wherein the first and second optical path control means are disposed one upon the other.

* * * * *